(12) United States Patent
Zhang et al.

(10) Patent No.: US 8,790,000 B2
(45) Date of Patent: Jul. 29, 2014

(54) AUTOMATIC MILK PREPARING DEVICE

(75) Inventors: Shun Zhang, Guangdong (CN); Yi Jiang, Guangdong (CN)

(73) Assignees: Shun Zhang, Shenzhen, Guangdong (CN); Shenzhen Juding Medical Equipment Co., Ltd., Shenzhen, Guangdong (CN)

( * ) Notice: Subject to any disclaimer, the term of this patent is extended or adjusted under 35 U.S.C. 154(b) by 108 days.

(21) Appl. No.: 13/384,839

(22) PCT Filed: Jul. 23, 2009

(86) PCT No.: PCT/CN2009/001515
§ 371 (c)(1),
(2), (4) Date: Apr. 2, 2012

(87) PCT Pub. No.: WO2011/009233
PCT Pub. Date: Jan. 27, 2011

(65) Prior Publication Data
US 2012/0182824 A1    Jul. 19, 2012

(30) Foreign Application Priority Data
Jul. 23, 2009 (CN) .......................... 2009 1 0108829

(51) Int. Cl.
*B01F 15/04* (2006.01)
(52) U.S. Cl.
USPC ........................... 366/141; 366/152.2; 99/280
(58) Field of Classification Search
USPC ........................... 366/141, 145, 152.1, 152.2;
99/280–283, 289 R, 290, 299–300, 305;
251/65
See application file for complete search history.

(56) References Cited

U.S. PATENT DOCUMENTS

| | | | | |
|---|---|---|---|---|
| 4,116,246 A * | 9/1978 | Franzen | ......................... | 141/362 |
| 5,207,148 A * | 5/1993 | Anderson et al. | ............... | 99/281 |
| 5,931,343 A * | 8/1999 | Topar et al. | ..................... | 222/56 |
| 6,058,247 A * | 5/2000 | Lahey et al. | .................. | 392/399 |
| 6,173,117 B1 * | 1/2001 | Clubb | .......................... | 392/442 |
| 6,387,424 B2 * | 5/2002 | Funk | ............................. | 426/231 |
| 6,571,564 B2 * | 6/2003 | Upadhye et al. | ................. | 62/3.3 |
| 6,837,397 B2 * | 1/2005 | Lassota | ..................... | 222/129.3 |
| 7,104,184 B2 * | 9/2006 | Biderman et al. | ............... | 99/282 |
| 7,316,249 B2 * | 1/2008 | Cheong | ......................... | 141/100 |
| 2008/0110935 A1* | 5/2008 | Huber et al. | .................. | 222/221 |
| 2009/0151574 A1* | 6/2009 | Nijboer et al. | .................. | 99/282 |

FOREIGN PATENT DOCUMENTS

| | | | |
|---|---|---|---|
| CN | 1289549 A | 4/2001 | |
| CN | 1615100 A | 5/2005 | |

(Continued)

*Primary Examiner* — David Sorkin
*Assistant Examiner* — Abbas Rashid
(74) *Attorney, Agent, or Firm* — Greer, Burns & Crain, Ltd.

(57) ABSTRACT

An automatic milk preparing device is provided, including a microcontroller fixed in the automatic milk preparing device for controlling the operation of same, a powder box connected with the microcontroller and provided with a powder output gate in the front of the powder box for controlling the powder to be added according to the signal from the microcontroller, a water tank connected with the microcontroller for controlling the water to be added according to the signal from the microcontroller, a stirring structure fixed under the powder output gate, connected with the water tank through a first water pipe and provided with a milk outlet at the lower part of the stirring structure, and a weight measuring structure fixed below the stirring structure and connected with the microcontroller for laying a milk bottle, weighing water and/or milk powder in the bottle and feeding the result of weight back to the microcontroller.

10 Claims, 8 Drawing Sheets

(56) References Cited

FOREIGN PATENT DOCUMENTS

| | | |
|---|---|---|
| CN | 2754527 Y | 2/2006 |
| CN | 201039926 Y | 3/2008 |
| CN | 101291607 A | 10/2008 |
| DE | 20006115 U1 | 6/2000 |
| GB | 2405602 A | 9/2005 |

* cited by examiner

AUTOMATIC MILK PREPARING DEVICE

FIELD OF THE INVENTION

The present invention relates to the field of household appliances in daily life, and particularly to an automatic milk preparing device.

BACKGROUND OF THE INVENTION

In life, most of families feed infants or young children with formula milk powder. Many problems exist during preparing milk.

(1) The temperature of water for preparing milk scientifically should be in the range of 45-55° C. When preparing milk in this range of temperature, the nutrient composition in milk powder will not be destroyed, and it is also a suitable temperature for drinking. However, when manually preparing milk, it is difficult to control the temperature of water, and the temperature of water is often too high or too low.

(2) To feed infants or young children in a scientific manner, it is necessary to prepare milk according to the ratio required by the standard of formula milk powder. However, when manually preparing milk, it is difficult to control the amount of powder and water accurately. When there is too much powder, the milk liquid will be too thick, leading to poor digestion for infants or young children. When there is too little powder, the milk liquid will be too thin, leading to poor nutrition for infants or young children.

(3) In case that the milk powder is exposed to the air for a long time or contacts with hands, bacteria may breed in the milk powder and lead to cross infection. Firstly, during preparing milk each time, it is necessary to open the powder box, and the milk powder is frequently exposed to the air for long terms and large areas. As a result, the bacteria in the air may invade the milk powder, and cause the milk powder to deteriorate, which is not favorable for preserving the milk powder. Secondly, during taking the milk powder, it is often necessary to put a spoon into the milk box by hand, thus the bacteria on the hand may propagate to the milk powder, leading to cross infection during feeding infants or young children. In order to store the milk powder hygienically, this case should be avoided as much as possible.

(4) The scientific method for preparing milk is to put a little water into a container, and then add milk powder and additional water sequentially or simultaneously. However, this is hardly realized when preparing milk manually.

(5) The scientific method for blending the milk liquid should avoid shaking violently which easily induce a lot of bubbles in the liquid. However, during to manually preparing milk, people usually shake the milk bottle hard with hands, leading to the production of a lot of bubbles in the milk liquid. When fed with such milk, the infants or young children may suffer from abdominal flatulence, vomiting or crying.

(6) To ensure health and safety, the milk bottle should be sterilized with physical methods after each use. In the reality, it is generally sterilized by soaking in boiling water or by boiling, which is time and labor consuming.

(7) In the fast-paced life, the modern people may desire a prompt, convenient, fast, and safe manner to prepare milk. Preparing milk in a cumbersome manner frequently may lead to insomnia and amnesia for an adult and crying of infants or young children, which makes people mentally and physically exhausted and affects the quality of life seriously.

To sum up, there are obviously inconveniences and defects in the existing milk preparing device during actual use, and there is necessity for improvement.

SUMMARY OF THE INVENTION

In view of the above defects, the object of the present invention is to provide an automatic milk preparing device, which can accurately control the weight of milk powder and water and allow the milk to be prepared in a more scientific manner.

To achieve the above objects, the present invention provides an automatic milk preparing device, comprising: a microcontroller, which is fixed in the automatic milk preparing device for controlling the operation of the automatic milk preparing device; a powder box, which is connected with the microcontroller and provided with a powder output gate in the front of the powder box, for controlling the powder to be added according to the signal from the microcontroller; a water tank, which is connected with the microcontroller for controlling the water to be added according to the signal from the microcontroller; a stirring structure, which is fixed below the powder output gate, connected with the water tank through a first water pipe, and provided with a milk outlet at the lower part of the stirring structure; a weight measuring structure, which is fixed below the stirring structure and connected with the microcontroller for laying a milk bottle, weighing water and/or milk powder in the milk bottle, and feeding the result of weight back to the microcontroller. Herein, the milk powder and water are fed into the stirring structure from the powder box and the water tank respectively for stirring, and flow into the milk bottle through the milk outlet of the stirring structure, and the microcontroller controls the weight of water and/or powder to be added for next time according to the weight of water and/or milk powder in the milk bottle.

According to the automatic milk preparing device of the present invention, the microcontroller controls the water tank to add water for the first time, the weight measuring structure weighs water in the milk bottle and feeds the result of weight back to the microcontroller; the microcontroller controls the powder box to add powder for the first time and the water tank to add water for the second time, the weight measuring structure weighs milk liquid in the milk bottle and feeds the result of weight back to the microcontroller; the microcontroller controls the powder box to add powder for the second time and the water tank to add water for the third time. The addition of the powder and water can be performed for several times.

According to the automatic milk preparing device of the present invention, the microcontroller calculates the flowrate of water to be added according to the time period of the first water addition and the weight of water in the milk bottle; and the microcontroller controls the amount of water to be added by the water tank for the second and third times according to the flowrate of the first water addition.

According to the automatic milk preparing device of the present invention, the microcontroller calculates the flowrate of powder to be added according to the time of the first powder addition by the powder box and the weight of milk powder in the milk bottle; and the microcontroller controls the amount of powder to be added by the powder box for the second time according to the flowrate of the first powder addition.

According to the automatic milk preparing device of the present invention, the weight measuring structure comprises a pressure sensor connected with the microcontroller.

According to the automatic milk preparing device of the present invention, the stirring structure is funnel shaped, and provided on the side wall with a water inlet connected with the first water pipe.

According to the automatic milk preparing device of the present invention, there is a powder adding transmission structure provided in the powder box. The powder adding transmission structure comprises a worm with a helical structure, at least one turbine, and a first motor for driving the worm to rotate; and one end of the worm is located above the powder output gate of the powder box, and the other end is connected with the motor.

According to the automatic milk preparing device of the present invention, there are a plurality of teeth engaging with the worm provided at the edge of the turbine, and the worm drives the turbine to rotate; and there are a plurality of stirring pieces for stirring milk powder provided on the turbine, and milk powder is transferred to the powder output gate by means of engagement between the worm and the turbine.

According to the automatic milk preparing device of the present invention, there are magnets which cooperate with each other provided on the powder output gate of the powder box and the worm, respectively.

According to the automatic milk preparing device of the present invention, the powder output gate is opened when the powder is added from the powder box; and the powder output gate is closed when powder adding is finished.

According to the automatic milk preparing device of the present invention, the microcontroller controls the motor to drive the worm to rotate, and to transfer milk powder to the powder output gate by means of engagement between the worm and the turbine, while the magnet on the worm and the magnet on the powder output gate open the powder output gate by means of magnetic interaction; and the microcontroller controls the motor to rotate inversely by a predetermined angle, while the magnet on the worm and the magnet on the powder output gate close the powder output gate by means of magnetic interaction.

According to the automatic milk preparing device of the present invention, the automatic milk preparing device further comprises a lifting controller connected with the weight measuring structure for lifting up or down the milk bottle according to the signal from the microcontroller.

According to the automatic milk preparing device of the present invention, the lifting controller comprises a second motor for driving the lifting controller to work.

According to the automatic milk preparing device of the present invention, the lifting controller further comprises at least one position controlling structure arranged at the periphery of the milk outlet of the stirring structure, for sensing the position of the mouth of the milk bottle and feeding it back to the microcontroller.

According to the automatic milk preparing device of the present invention, when there is some distance between the mouth of the milk bottle and the milk outlet, the microcontroller controls the lifting controller to lift up the milk bottle; and when the mouth of the milk bottle is flush with the milk outlet, the microcontroller controls the lifting controller to maintain the current position of the milk bottle.

According to the automatic milk preparing device of the present invention, the automatic milk preparing device further comprises a heat radiating structure, and the heat radiating structure is connected with the water tank through the second and third water pipes.

According to the automatic milk preparing device of the present invention, the heat radiating structure comprises a housing, at least one fan arranged on the housing, and a helical pipe connected with the second and third water pipes.

According to the automatic milk preparing device of the present invention, there are water pumps provided on the water tank, which are connected with the first and second water pipes, respectively.

According to the automatic milk preparing device of the present invention, there is a heating plate provided at the bottom of the water tank, which is connected with the microcontroller.

According to the automatic milk preparing device of the present invention, there is a temperature sensor provided in the water tank, which is connected with the microcontroller.

According to the automatic milk preparing device of the present invention, the temperature sensor detects the temperature of water in the water tank and feeds it back to the microcontroller, and when the temperature of water is higher than a predetermined temperature, the microcontroller controls the water tank to stop heating and the heat radiating structure to start work; and when the temperature of water is lower than the predetermined temperature, the microcontroller controls the water tank to heat and the heat radiating structure to stop work.

According to the automatic milk preparing device of the present invention, the automatic milk preparing device further comprises a sterilizing chamber connected with the water tank; there is a solenoid valve provided between the sterilizing chamber and the water tank, the solenoid valve is connected with the water tank and the sterilizing chamber through the fourth and fifth water pipes respectively, and there is a heating plate provided at the bottom of the sterilizing chamber.

According to the automatic milk preparing device of the present invention, the automatic milk preparing device further comprises an LCD display device which is connected with the microcontroller.

According to the automatic milk preparing device of the present invention, the powder box further comprises a cover with a buckle, and the cover is provided with a ring seal.

The present invention provide a weight measuring structure which is below the stirring structure and connected with the microcontroller, and used for laying a milk bottle, weighing water and/or milk powder in the milk bottle, and feeding the result of weight back to the microcontroller. The microcontroller calculates and controls the amount of water and powder to be added for the next time according to the weight of the water or milk liquid within the milk bottle, so that the final ratio of milk powder to water in the milk liquid is reasonable. Thereby, the present invention can accurately control the ratio between milk powder and water so as to achieve a more scientific manner for preparing milk.

Preferably, the stirring structure of the present invention is funnel shaped and provided on the side wall with a water inlet, and the milk powder falls into the stirring structure directly from the powder output gate; while the powder is added, water horizontally flows into the inner wall of the stirring structure from the water inlet, and quickly form rotation in the stirring structure. The impulsive force of water not only results in quick blend of the milk powder and water during rotation, but also has the function of stirring, and the milk liquid flows out of the stirring structure via the milk outlet, thus achieving the purpose of quickly dissolving the milk powder, and preventing the formation of a lot of bubbles in the milk liquid, which are easily formed when the milk is shaken violently by hand.

There is a worm and a turbine provided in the powder box according to the present invention. When the powder is added, the microcontroller controls the motor to drive the worm to rotate, and to transfer milk powder to the powder output gate by means of engagement between the worm and the turbine, while the magnet on the worm and the magnet on the powder output gate open the powder output gate by means of magnetic interaction; after powder adding is finished, the microcontroller controls the motor to rotate inversely by a predetermined angle, the magnet on the worm and the magnet on the powder output gate close the powder output gate by means of magnetic interaction. Thereby, the present invention prevents the milk powder from exposing to the air frequently for long times and in large areas, allowing the milk powder not to be deteriorated due to invasion of bacteria from the air.

DETAILED DESCRIPTION OF THE EMBODIMENTS

In order to appreciate the objects, technical solutions, and advantages of the present invention more clearly, the present invention will further be described hereinafter with reference to the accompanying drawings and the embodiments. It is appreciated that the particular embodiments are provided only for illustrating the present invention and should not be construed as limiting the present invention.

Figure 1:
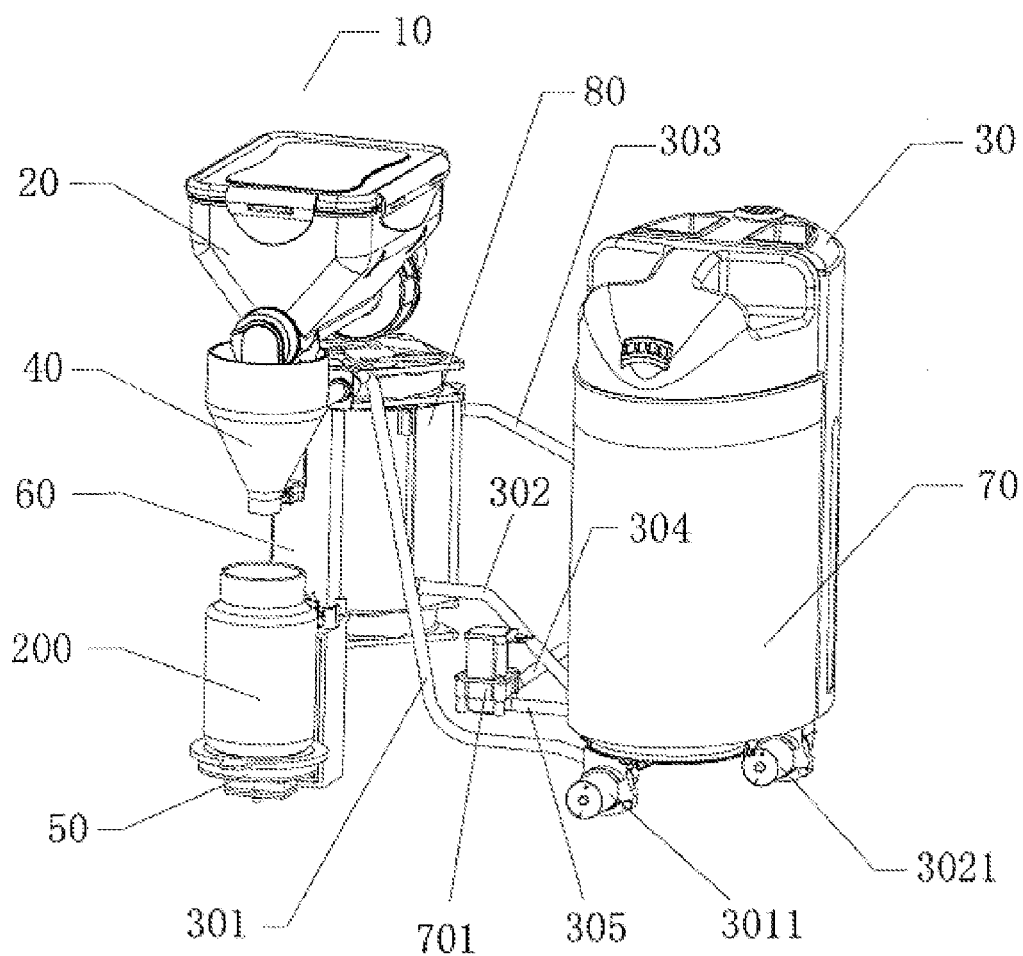
FIG. 1 is a structural view showing an embodiment of an automatic milk preparing device of the present invention.
Figure 2:
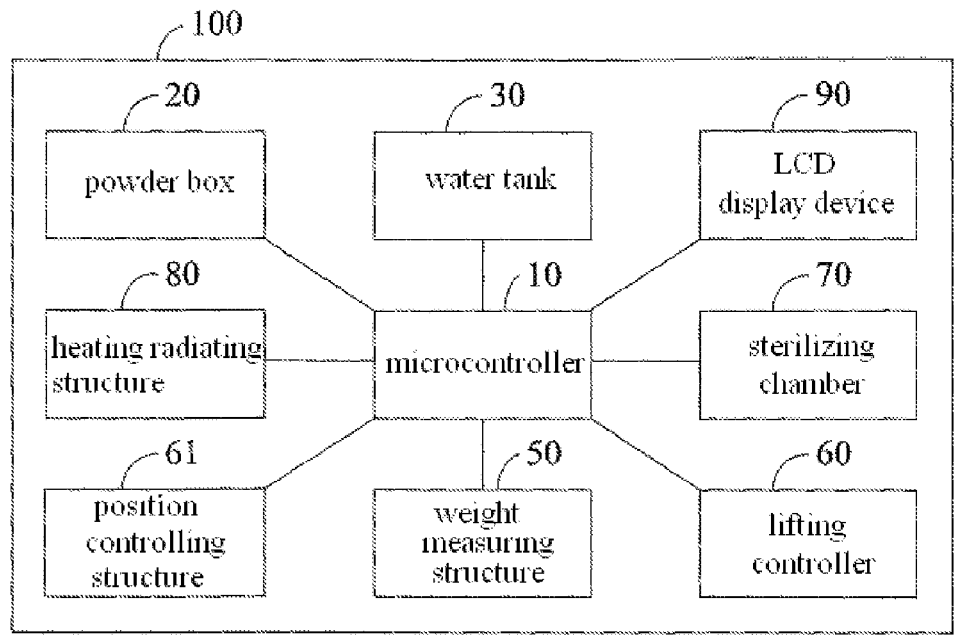
FIG. 2 is a structural diagram showing the circuit principle of the automatic milk preparing device of the present invention.

As shown in FIGS. 1 and 2, an automatic milk preparing device 100 according to the present invention comprises a microcontroller 10 for controlling the operation of the automatic milk preparing device 100, a powder box 20, a water tank 30, a stirring structure 40, and a weight measuring structure 50. The microcontroller 10 is fixed in the automatic milk preparing device 100, and is electrically connected with the powder box 20, the water tank 30 and the weight measuring structure 50. As shown in FIGS. 1-2, 6, and 8-9, a powder output gate 201 is provided in the front of the powder box 20, and the powder box 20 controls the powder addition through the powder output gate 201 according to the signal from the microcontroller 10. The water tank 30 is used to store water and control the water addition according to the signal from the microcontroller 10. On the bottom of the water tank 30 there is a heating plate connected with the microcontroller 10 for heating water in the water tank 30 according to the signal from the microcontroller 10. A stirring structure 40 is fixed below the powder output gate 201, connected with the water tank 30 through a first water pipe 301, and provided with a milk outlet 401 at the lower part of the stirring structure. A weight measuring structure 50 is fixed below the stirring structure 40 for laying a milk bottle 200, weighing water and/or milk powder in the milk bottle 200, and feeding the result of weight back to the microcontroller 10. The weight measuring structure 50 comprises a pressure sensor connected with the microcontroller 10, and weighs water and/or milk powder in the milk bottle 200 by means of the pressure sensor.

Here, the milk powder and water are fed into the stirring structure 40 from the powder box 20 and the water tank 30 respectively for stirring, and then flow into the milk bottle 200 through the milk outlet 401 of the stirring structure 40. The microcontroller 10 controls the weight of water to be added by the water tank 30 and/or powder to be added by the powder box 20 for the next time according to the weight of water and/or milk powder in the milk bottle 200, so that the ratio of milk powder to water in the milk liquid is reasonable and scientific. Thereby, the present invention can accurately control the ratio between milk powder and water so as to achieve a more scientific manner for preparing milk.

Figure 3:
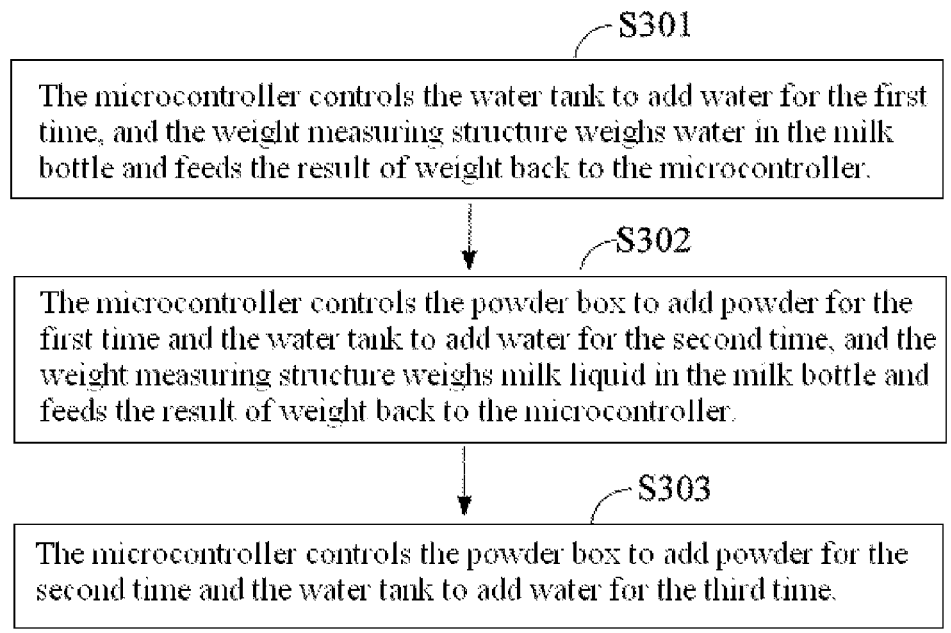
FIG. 3 is a flow chart of preparing milk using the automatic milk preparing device of the present invention.

As shown in FIGS. 2 and 3, the automatic milk preparing device 100 may prepare milk by the followings steps.

S301, the microcontroller 10 controls the water tank 30 to add water for the first time; and the weight measuring structure 50 weighs water in the milk bottle 200 and feeds the result of weight back to the microcontroller 10.

S302, the microcontroller 10 controls the powder box 20 to add powder for the first time and the water tank 30 to add water for the second time; and the weight measuring structure 50 weighs milk liquid in the milk bottle 200 and feeds the result of weight back to the microcontroller 10.

S303, the microcontroller 10 controls the powder box 20 to add powder for the second time and the water tank 30 to add water for the third time. Clearly, the addition of powder and water can be performed for several times.

Figure 4:
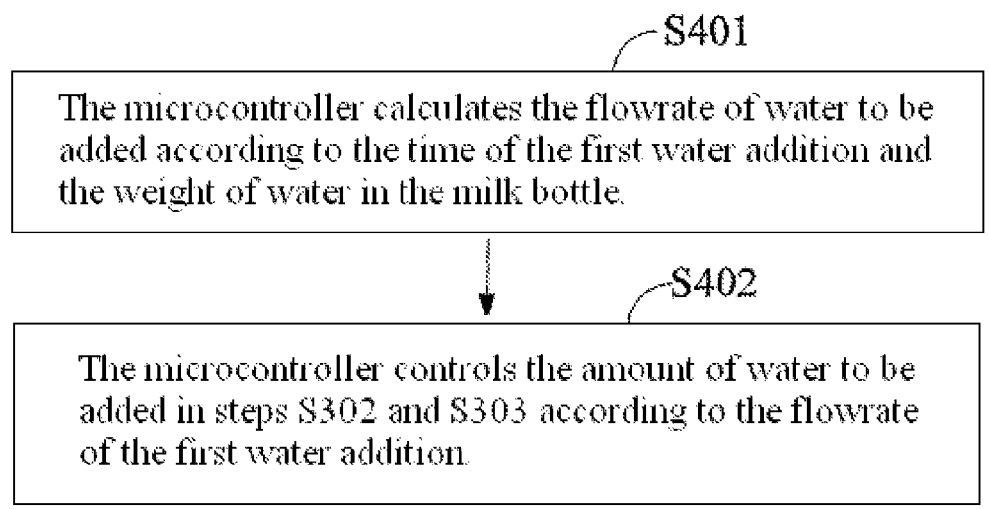
FIG. 4 is a flow chart of controlling water addition by a microcontroller in the automatic milk preparing device of the present invention.

As shown in FIG. 4, step S301 may further comprise the following steps.

S401, the microcontroller 10 calculates the flowrate of water to be added according to the time of the first water addition and the weight of water in the milk bottle 200. The flowrate of water to be added is calculated as the weight of water in the milk bottle 200 divided by the time of the water addition, thus obtaining the weight of water to be added per unit time.

S402, the microcontroller 10 controls the amount of water to be added in steps S302 and S303 according to the flowrate of the first water addition.

Figure 5:
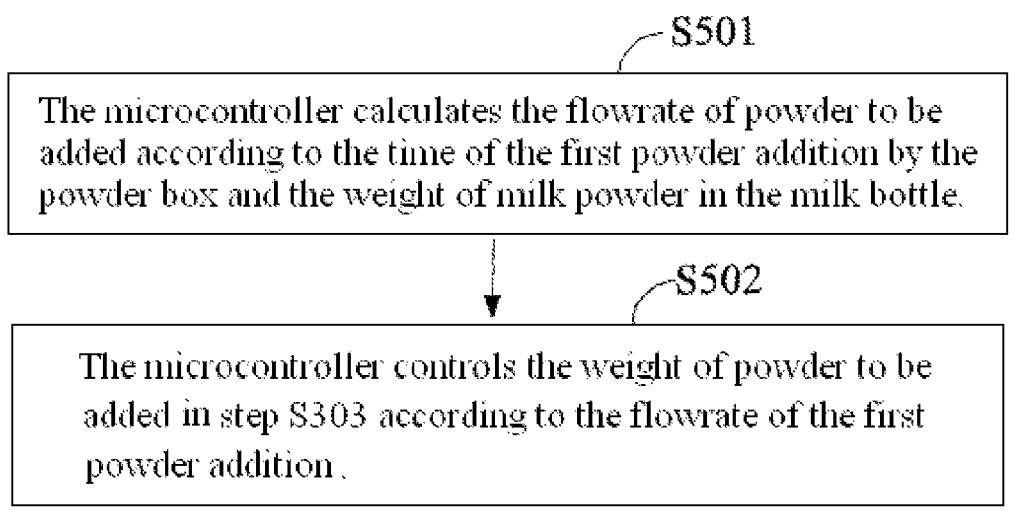
FIG. 5 is a flow chart of controlling powder addition by a microcontroller in the automatic milk preparing device of the present invention.

As shown in FIG. 5, step S302 may further comprise the following steps.

S501, the microcontroller 10 calculates the flowrate of powder to be added according to the time of the first powder addition by the powder box 20 and the weight of powder in the milk bottle 200. The flowrate of powder to be added is calculated as the weight of powder in the milk bottle 200 divided by the time of the powder addition, thus obtaining the weight of powder to be added per unit time.

S502, the microcontroller 10 controls the weight of powder to be added in step S303 according to the flowrate of the first powder addition.

In step S302, the weight of milk powder in the milk bottle 200 is the weight of milk liquid in the milk bottle 200 minus the weight of water in the milk bottle 200. And the weight of water may be calculated as the flowrate calculated during the first water addition multiplied by the time of water addition.

In step S303, the microcontroller 10 calculates the weight of water and milk powder which is further needed according to the weight of water and the weight of milk powder in the milk liquid, and accurately controls the time of the second powder addition and the time of the third water addition according to the flowrate of water addition and the flowrate of powder addition calculated in steps S301 and S302 so as to achieve an accurate ratio of water to powder in the milk liquid.

As shown in FIGS. 1 and 2, the automatic milk preparing device 100 according to the present invention further comprises a lifting controller 60, a position controlling structure 61, a sterilizing chamber 70, a heat radiating structure 80, and an LCD display device 90, each of which is electrically connected with the microcontroller 10.

Figure 6:
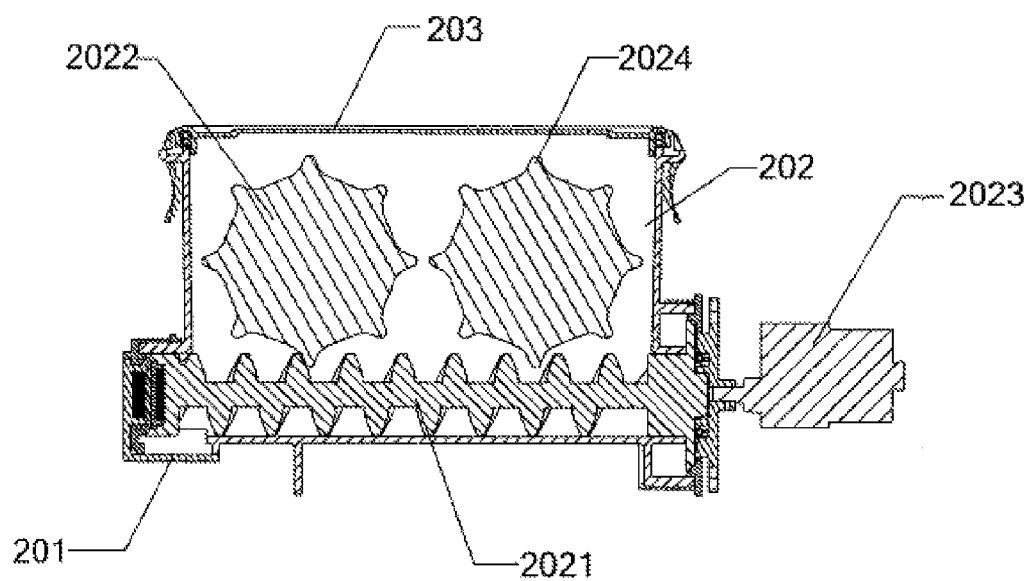
FIG. 6 is a cross sectional view showing a powder box in the automatic milk preparing device of the present invention.
Figure 7:
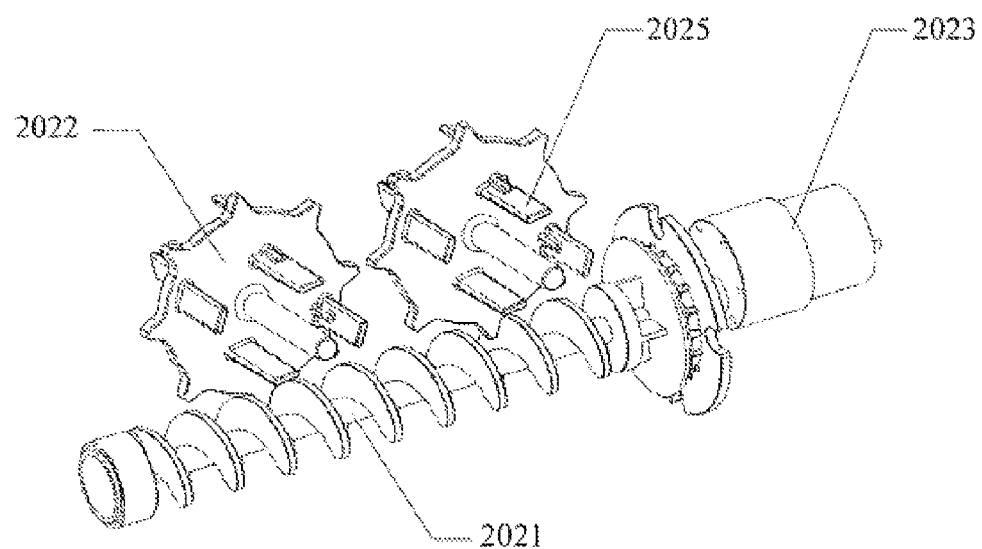
FIG. 7 is a structural view showing engagement between a worm and a turbine in the automatic milk preparing device of the present invention.
Figure 8:
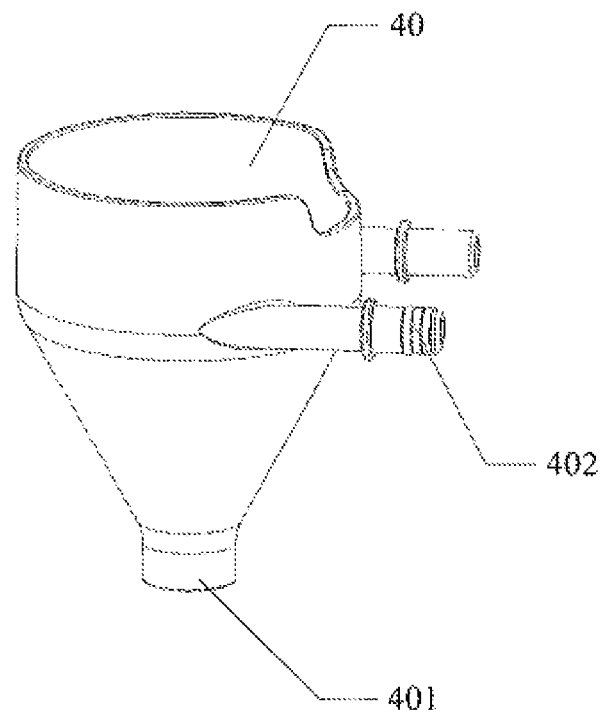
FIG. 8 is a structural view showing a stirring structure in the automatic milk preparing device of the present invention.

As shown in FIGS. 6 and 7, a powder adding transmission structure 202 is provided in the powder box 20. The powder adding transmission structure 202 comprises a worm 2021 defining a helical structure, at least one turbine 2022, and a first motor 2023 for driving the worm 2021 to rotate. One end of the worm 2021 is located above the powder output gate 201 of the powder box 20, and the other end is connected with the first motor 2023. The edge of the turbine 2022 is provided with a plurality of teeth 2024 engaging with the worm 2021, and the worm 2021 drives the turbine 2022 to rotate by engagement between the teeth 2024 and the worm 2021 defining a helical structure. Also, the turbine 2022 is provided with a plurality of stirring pieces 2025 for stirring milk powder. The stirring pieces 2025 stir the powder in the powder box 20 and it is favorable to keep the powder fresh. The milk powder in the powder box 20 is transferred to the powder output gate 201 by means of engagement between the worm 2021 and the turbine 2022. Magnets which cooperate with each other are provided on the powder output gate 201 of the powder box 20 and the worm 2021, respectively. Preferably, the magnet for the worm 2021 is arranged at the end of the worm 2021 which is close to the powder output gate 201.

When it is required to add powder, the microcontroller 10 controls the first motor 2023 to drive the worm 2021 to rotate, and to transfer the milk powder to the powder output gate 201 by means of engagement between the worm 2021 and the turbine 2022. Meanwhile, the magnet on the worm 2021 and the magnet on the powder output gate 201 open the powder output gate 201 by means of magnetic interaction; after adding powder, the microcontroller 10 controls the first motor 2023 to rotate inversely by a predetermined angle. When the first motor 2023 rotates by a predetermined angle, the worm 2021 also rotates by a predetermined angle, so that the magnetic pole of the magnet on the worm 2021 changes and the powder output gate 201 is closed by means of magnetic interaction between the magnet on the worm 2021 and the magnet on the powder output gate 201.

According to the present invention, the powder output gate 201 is only opened when it is required to add powder, and the powder output gate 201 is closed automatically when the powder adding is complete. In this way, it is possible to prevent the water vapor from entering the powder box 20 through the powder output gate 201 and thus contacting the powder. Besides, it is possible to prevent the bacteria in the air from invading the milk powder. Preferably, the powder box 20 further comprises a top cover 203 with a buckle, and the cover 203 is provided with a ring seal. Thereby, the present invention is favorable to the preservation of the milk powder.

As shown in FIGS. 1, 6, and 8-9, the stirring structure 40 is funnel shaped, and provided on its side wall with a water inlet 402 connected with the first water pipe 301. During preparing milk, the milk powder falls into the stirring structure 40 directly from the powder output gate 201. Meanwhile, the water tank 30 horizontally feeds water into the stirring structure 40 through the water inlet 402, and the water quickly forms a rotation movement along the funnel shaped stirring structure 40. In this way, the impulsive force of water not only allows milk powder and water to be blended quickly during rotation in the funnel, but also has the function of stirring. Then, the milk liquid flows out of the stirring structure 40 via the milk outlet 401, achieving the purpose of quickly dissolving the milk powder, and preventing the formation of a lot of bubbles in the milk liquid, which are easily formed when the milk is shaken violently by hand.

Figure 9:
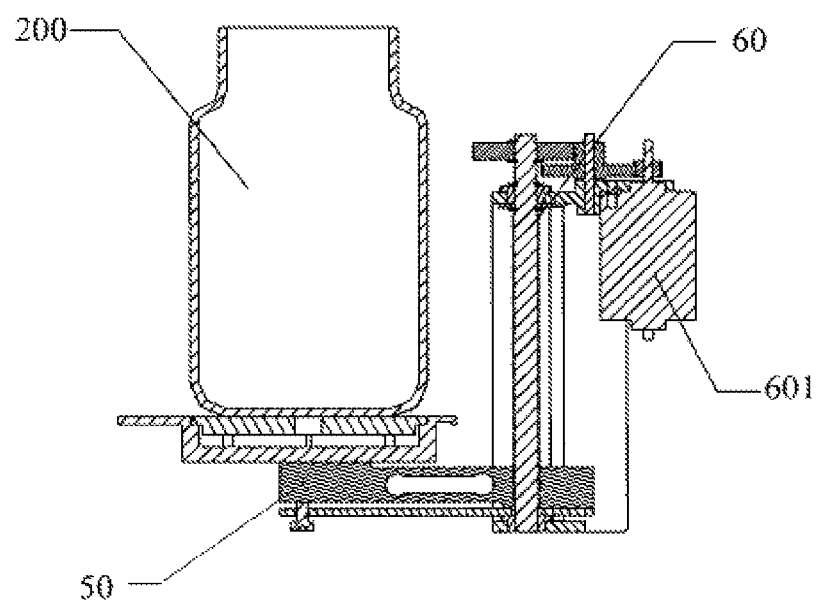
FIG. 9 is a structural view showing cooperation between a weight measuring structure and a lifting controller in the automatic milk preparing device of the present invention.

As shown in FIGS. 2 and 9, the automatic milk preparing device 100 further comprises a lifting controller 60 connected with the weight measuring structure 50. The weight measuring structure 50 is used for laying the milk bottle 200, and the lifting controller 60 lifts up or down the milk bottle 200 according to the signal from the microcontroller 10.

Figure 10:
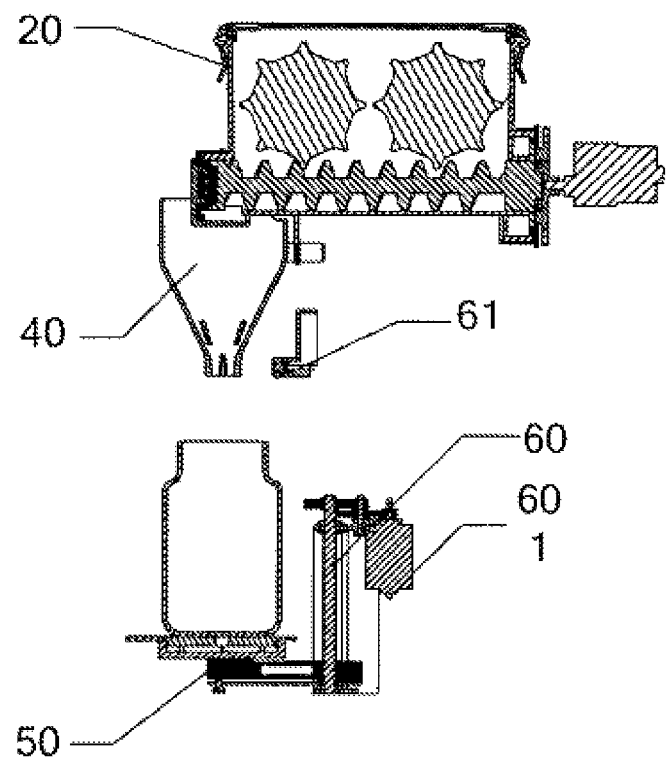
FIG. 10 is a structural view showing cooperation among a weight measuring structure, a lifting controller, and a position controlling structure in the present invention.
Figure 11:
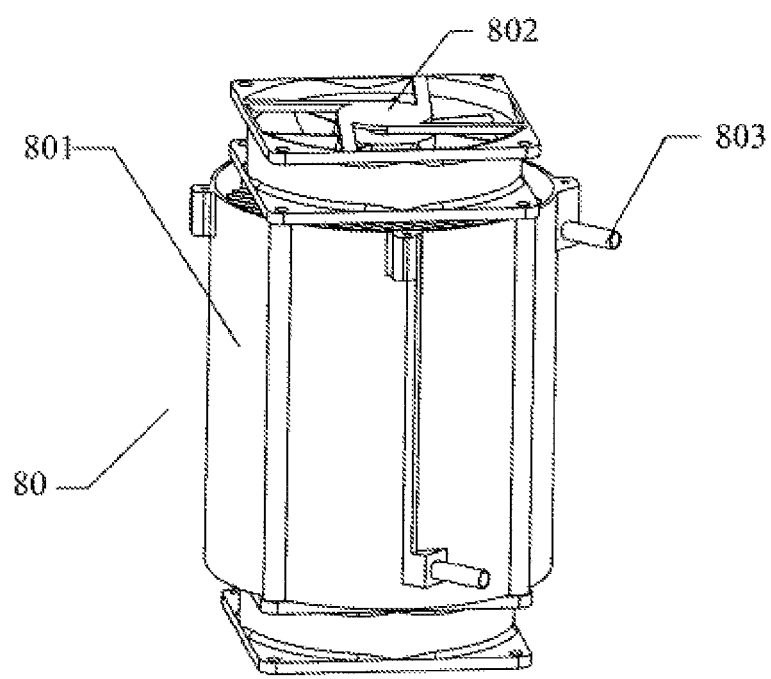
FIG. 11 is a perspective view showing a heat radiating structure in the automatic milk preparing device of the present invention.
Figure 12:
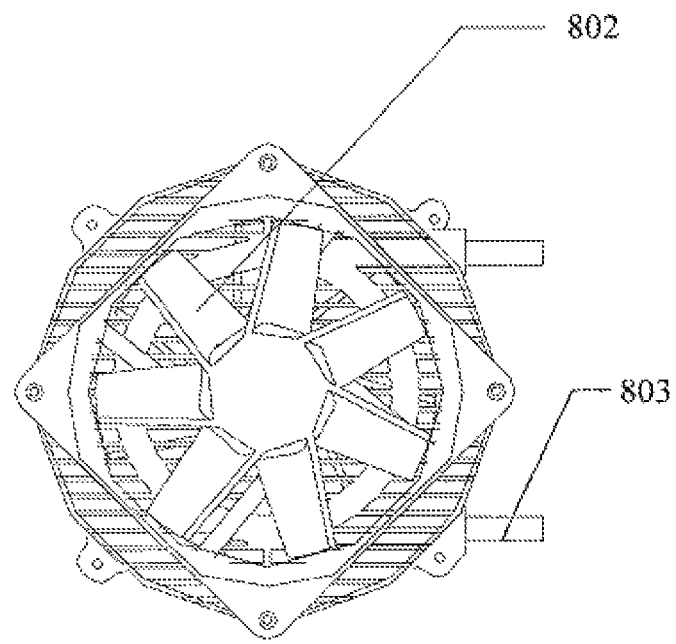
FIG. 12 is a top view showing the heat radiating structure in the automatic milk preparing device of the present invention.
Figure 13:
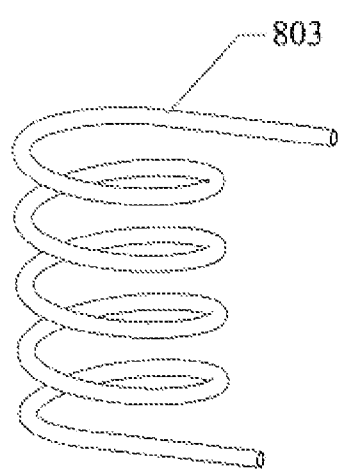
FIG. 13 is a perspective view showing a helical pipe of the heat radiating structure in the automatic milk preparing device of the present invention.
Figure 14:
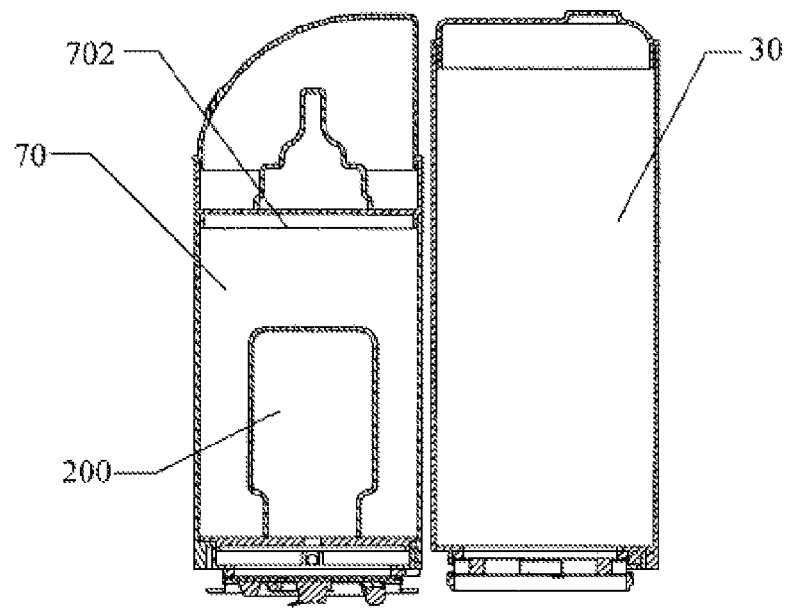
FIG. 14 is a cross sectional view showing a sterilizing chamber and a water tank in the automatic milk preparing device of the present invention.
Figure 15:
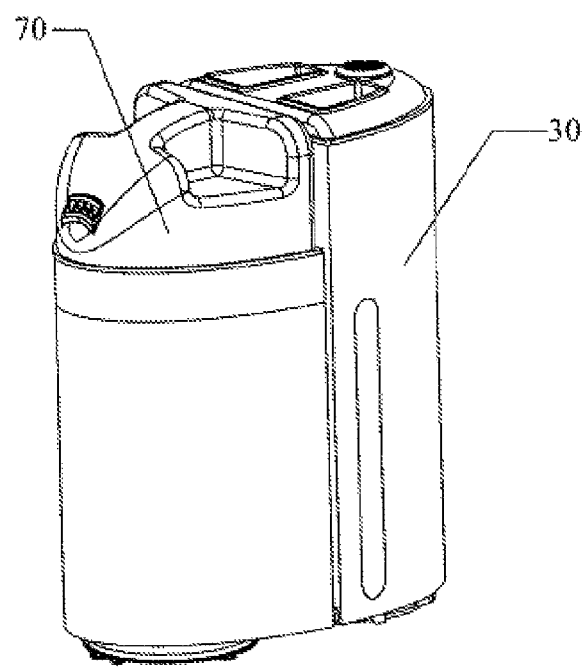
FIG. 15 is a perspective view showing the sterilizing chamber and the water tank in the automatic milk preparing device of the present invention.

As shown in FIG. 10, the lifting controller 60 further comprises at least one position controlling structure 61 arranged at the periphery of the milk outlet 401 of the stirring structure 40 and a second motor 601 for driving the lifting controller 60 to work. The position controlling structure 61 senses the position of the mouth of the milk bottle 200 and feeds it back to the microcontroller 10. During preparing milk, when there is some distance between the mouth of the milk bottle 200 and the milk outlet 401, in order to prevent milk liquid from splashing from the milk bottle 200, the microcontroller 10 will control the lifting controller 60 to lift up the milk bottle 200. When the mouth of the milk bottle 200 is flush with the position of the milk outlet 401, the microcontroller 10 will control the lifting controller 60 to maintain the milk bottle 200 at the current position for preparing milk; and when milk preparing is finished, the microcontroller 10 will control the lifting controller 60 to lift down the milk bottle 200. Obviously, there may be provided with one or more position controlling structures 61.

As shown in FIGS. 1-2, and 11-13, the automatic milk preparing device 100 further comprises a heat radiating structure 80. The heat radiating structure 80 is connected with the water tank 30 through the second water pipe 302 and the third water pipe 303. The heat radiating structure 80 comprises a housing 801, at least one fan 802 arranged on the housing 801, and a helical pipe 803 connected with the second water pipe 302 and the third water pipe 303. The heat radiating structure 80 is used to cool the boiling water in the water tank 30 to a predetermined temperature for preparing milk. There may be provided with one or more fans 802, and preferably two fans.

The water tank 30 is provided with water pumps 3011 and 3021, which are connected with the first water pipe 301 and the second water pipe 302, respectively. During radiating heat, the microcontroller 10 controls water pump 3021 to transfer water in the water tank 30 to the heat radiating structure 80 through the second water pipe 302, reduce the temperature of boiling water in the water tank 30 by means of the fan 802 and the helical pipe 803, and then return the water to the water tank 30 through the third water pipe 303.

A temperature sensor is further provided in the water tank 30. The temperature sensor is connected with the microcontroller 10, detects the temperature of water in the water tank 30 and feeds it back to the microcontroller 10. When the temperature of water is higher than a predetermined temperature, the microcontroller 10 controls the heating plate in the water tank 30 to stop heating, and the heat radiating structure 80 starts to work at the same time. When the temperature of water is lower than a predetermined temperature, the microcontroller 10 controls the heating plate in the water tank 30 to heat, and the heat radiating structure 80 stops working at the same time.

Preferably, when the water reaches a temperature of the predetermined temperature +2° C. (an upper limit), the heating plate stops heating. When the water reaches a temperature of a predetermined temperature −2° C. (a lower limit), the heating plate starts to heat. In this way, the temperature of water can be constantly maintained at the predetermined temperature ±2° C. so as to prepare milk properly.

As shown in FIGS. 1-2, and 14-15, the automatic milk preparing device 100 further comprises a sterilizing chamber 70 connected with the water tank 30. A solenoid valve 701 is provided between the sterilizing chamber 70 and the water tank 30. The solenoid valve 701 is connected with the water tank 30 and the sterilizing chamber 70 through the fourth water pipe 304 and the fifth water pipe 305, respectively. The sterilizing chamber 70 is further provided with a shelf 702 for laying nipples. When it is required to sterilize, the microcontroller 10 controls the solenoid valve 701 to open, allowing water in the water tank 30 to enter into the sterilizing chamber 70. There is a heating plate at the bottom of the sterilizing chamber 70. Water in the sterilizing chamber 70 is heated to its boiling temperature with the heating plate, and the milk bottle 200 and nipples in the sterilizing chamber 70 are sterilized by the high-temperature water vapor. Of course, it is also possible to use other sterilizing methods, such as boiling or ultraviolet sterilization.

Preferably, the automatic milk preparing device 100 according to the present invention further comprises an LCD display device 90 connected with the microcontroller 10. By means of the LCD display device 90, the user may operate the automatic milk preparing device 100. Meanwhile, the present invention also provides a speaker connected with the microcontroller 10. The speaker may remind the user to prepare and feed milk to infants or young children periodically according to the predetermined schedule by the microcontroller 10.

According to the present invention, it is possible to realize sterilizing the milk bottle 200, storing the milk powder hygienically, maintaining a constant temperature of water, weighing water and milk powder automatically and accurately, and integrated preparing and stirring in an automatic and scientific manner. Besides, it is possible to prepare milk in a simple, hygienical, safe and fast manner. The present application is also applicable for preparing drinks with various powder and particles. Under control of the microcontroller 10, one-touch preparing is possible, which is simple, fast, and hygienical in operation.

In summary, the present invention provide a weight measuring structure which is below the stirring structure and connected with the microcontroller, and used for laying a milk bottle, weighing water and/or milk powder in the milk bottle, and feeding the result of weight back to the microcontroller. The microcontroller calculates and controls the amount of water and powder to be added for the next time according to the weight of the water or milk liquid within the milk bottle, so that the final ratio of milk powder to water in the milk liquid is reasonable. Thereby, the present invention can accurately control the ratio between milk powder and water so as to achieve a more scientific manner for preparing milk.

Preferably, the stirring structure of the present invention is funnel shaped and provided on the side wall with a water inlet, and the milk powder falls into the stirring structure directly from the powder output gate; while the powder is added, water horizontally flows into the inner wall of the stirring structure from the water inlet, and quickly form rotation in the stirring structure. The impulsive force of water not only results in quick blend of the milk powder and water during rotation, but also has the function of stirring, and the milk liquid flows out of the stirring structure via the milk outlet, thus achieving the purpose of quickly dissolving the milk powder, and preventing the formation of a lot of bubbles in the milk liquid, which are easily formed when the milk is shaken violently by hand.

There is a worm and a turbine provided in the powder box according to the present invention. When the powder is added, the microcontroller controls the motor to drive the worm to rotate, and to transfer milk powder to the powder output gate by means of engagement between the worm and the turbine, while the magnet on the worm and the magnet on the powder output gate open the powder output gate by means of magnetic interaction; after powder adding is finished, the microcontroller controls the motor to rotate inversely by a predetermined angle, the magnet on the worm and the magnet on the powder output gate close the powder output gate by means of magnetic interaction. Thereby, the present invention prevents the milk powder from exposing to the air frequently for long times and in large areas, allowing the milk powder not to be deteriorated due to invasion of bacteria from the air.

The present invention certainly has many other embodiments. Various modifications and variations may made based on the present invention by the person skilled in the art without departing from the spirit and nature of the present invention, and such modifications and variations should fall within the scope of the present invention which is defined only by the appended claims.

What is claimed is:
1. An automatic milk preparing device, comprising:
a microcontroller fixed in the automatic milk preparing device for controlling the operation of the automatic milk preparing device;
a powder box connected with the microcontroller and provided with a powder output gate in the front of the powder box for controlling milk powder to be added according to a signal from the microcontroller;
a powder adding transmission structure in the powder box, the powder adding transmission structure including a worm with a helical structure, at least one turbine, and a motor for rotating the worm, wherein one end of the worm is located above the powder output gate of the powder box, and another end is connected with the motor;

a plurality of teeth engaging with the worm provided at the edge of the at least one turbine, wherein the worm drives the turbine to rotate;

a plurality of several stirring pieces for stirring the milk powder provided on the at least one turbine, wherein the milk powder is transferred to the powder output gate by engagement between the worm and the at least one turbine;

magnets which cooperate with each other provided on the powder output gate of the powder box and the worm respectively;

a water tank connected with the microcontroller for controlling the water to be added according to the signal from the microcontroller;

a stirring structure fixed below the powder output gate, connected with the water tank through a first water pipe, and provided with a milk outlet at the lower part of the stirring structure; and a weight measuring structure fixed below the stirring structure and connected with the microcontroller for receiving a milk bottle, weighing at least one of water and milk powder in the milk bottle, and feeding the result of weight back to the microcontroller;

wherein, the at least one of the water and the milk powder are fed into the stirring structure from the powder box and the water tank respectively for stirring, and flow into the milk bottle through the milk outlet of the stirring structure, and the microcontroller controls the weight of the at least one of the water and the milk powder to be added for a next time according to the weight of the at least one of the water and the milk powder in the milk bottle, wherein the microcontroller:
controls the water tank to add water for a first time, and the weight measuring structure weighs water in the milk bottle and feeds the result of weight back to the microcontroller;

controls the powder box to add milk powder for the first time and the water tank to add water for a second time, and the weight measuring structure weighs milk liquid in the milk bottle and feeds the result of weight back to the microcontroller;

controls the powder box to add milk powder for the second time and the water tank to add water for a third time, calculates the flowrate of water to be added according to the time of a first water addition and the weight of water in the milk bottle;

controls the amount of water to be added by the water tank for the second and third times according to the flowrate of the first water addition, calculates the flowrate of the milk powder to be added according to the time of a first powder addition by the powder box and the weight of milk powder in the milk bottle; and controls the amount of the milk powder to be added by the powder box for the second time according to the flowrate of the first powder addition, wherein the addition of the at least one of the water and the milk powder can be performed for several times.

2. The automatic milk preparing device according to claim 1, wherein
the weight measuring structure comprises a pressure sensor connected with the microcontroller.

3. The automatic milk preparing device according to claim 1, wherein
the stirring structure is funnel shaped and includes a side wall with a water inlet which is connected with the first water pipe.

4. The automatic milk preparing device according to claim 1, wherein
the powder output gate is opened when the powder is added from the powder box; and
the powder output gate is closed when powder adding is finished.

5. The automatic milk preparing device according to claim 1, wherein
the microcontroller controls the motor to drive the worm to rotate, and to transfer milk powder to the powder output gate by means of engagement between the worm and the turbine, while the magnet on the worm and the magnet on the powder output gate open the powder output gate by means of magnetic interaction; and
the microcontroller controls the motor to rotate inversely by a predetermined angle, while the magnet on the worm and the magnet on the powder output gate close the powder output gate by means of magnetic interaction.

6. The automatic milk preparing device according to claim 1, further comprising a lifting controller connected with the weight measuring structure for lifting up or down the milk bottle according to the signal from the microcontroller.

7. The automatic milk preparing device according to claim 1, further comprising
a heat radiating structure, the heat radiating structure is connected with the water tank through second and third water pipes, and the heat radiating structure comprises a housing, at least one fan arranged on the housing, and a helical pipe connected with the second and third water pipes.

8. The automatic milk preparing device according to claim 7, further comprising
a sterilizing chamber connected with the water tank; a solenoid valve is provided between the sterilizing chamber and the water tank; the solenoid valve is connected with the water tank and the sterilizing chamber through fourth and fifth water pipes respectively, and a heating plate is provided at the bottom of the sterilizing chamber.

9. The automatic milk preparing device according to claim 7, further comprising
a temperature sensor provided within the water tank, which is connected with the microcontroller.

10. The automatic milk preparing device according to claim 9, wherein
the temperature sensor detects the temperature of water in the water tank and feeds it back to the microcontroller, and when the temperature of water is higher than a predetermined temperature, the microcontroller controls the water tank to stop heating and the heat radiating structure to start work; and
when the temperature of water is lower than the predetermined temperature, the microcontroller controls the water tank to heat and the heat radiating structure to stop working.

* * * * *